United States Patent [19]

McIntyre

[11] Patent Number: 5,752,097
[45] Date of Patent: May 12, 1998

US005752097A

[54] APPARATUS FOR SUPPORTING A CAMERA TO FACE A SUBJECT TO BE PHOTOGRAPHED AND FOR ILLUMINATING THE SUBJECT

[75] Inventor: Dale Frederick McIntyre, Honeoye Falls, N.Y.

[73] Assignee: Eastman Kodak Company, Rochester, N.Y.

[21] Appl. No.: 697,744

[22] Filed: Aug. 29, 1996

[51] Int. Cl.⁶ .............................................. G03B 15/03
[52] U.S. Cl. ...................... 396/157; 396/106; 396/182
[58] Field of Search ................... 362/418, 419, 362/421, 427, 7; 396/157, 158, 173, 160, 162, 182, 175, 419, 427, 428, 106–110

[56] References Cited

U.S. PATENT DOCUMENTS

| | | | |
|---|---|---|---|
| 1,988,022 | 1/1935 | Smith | 240/2 |
| 2,622,496 | 12/1952 | Owens | 95/31 |
| 2,682,816 | 7/1954 | Walden | 354/132 |
| 2,684,822 | 7/1954 | Odin | 354/293 |
| 2,810,819 | 10/1957 | Gibson | 240/1.3 |
| 3,742,835 | 7/1973 | Bahnsen | 95/86 |
| 3,804,356 | 4/1974 | Olds | 248/179 |
| 4,285,588 | 8/1981 | Mir | 354/137 |
| 4,492,451 | 1/1985 | Maassen et al. | 354/416 |
| 4,648,697 | 3/1987 | Kawazoe | 354/293 |
| 4,908,642 | 3/1990 | Komatsuzaki et al. | 354/400 |
| 4,963,903 | 10/1990 | Cane | 354/81 |
| 5,043,750 | 8/1991 | Yamaguchi | 354/81 |
| 5,063,403 | 11/1991 | Yokonuma et al. | 354/413 |
| 5,097,284 | 3/1992 | Taniguchi et al. | 354/415 |
| 5,159,379 | 10/1992 | Shirane et al. | 354/415 |
| 5,164,759 | 11/1992 | Yasukawa | 357/415 |
| 5,176,442 | 1/1993 | Richardson | 362/286 |
| 5,202,720 | 4/1993 | Fujino et al. | 354/415 |
| 5,262,809 | 11/1993 | Nishimura et al. | 354/132 |
| 5,285,232 | 2/1994 | Ianiguchi et al. | 354/415 |
| 5,317,362 | 5/1994 | Takahashi | 354/418 |
| 5,424,794 | 6/1995 | McKay | 354/145.1 |
| 5,448,331 | 9/1995 | Hamada et al. | 354/403 |
| 5,517,392 | 5/1996 | Rousso et al. | 362/198 |
| 5,528,325 | 6/1996 | Perez | 354/81 |
| 5,687,402 | 11/1997 | Kishimoto et al. | 396/80 |

*Primary Examiner*—Safet Metjahic
*Assistant Examiner*—John Chizmar
*Attorney, Agent, or Firm*—Roger A. Fields

[57] ABSTRACT

A camera has an electronic flash unit for providing a flash exposure light pulse, and a selection mean device on the camera or on an auxiliary lamp has a selection setting for allowing the auxiliary lamp to provide a subject-conditioning pre-flash light pulse before the electronic flash unit provides the flash exposure light and another setting for allowing the auxiliary lamp to be continuously on to illuminate the subject instead of providing the pre-flash light pulse.

3 Claims, 5 Drawing Sheets

5,752,097

1

APPARATUS FOR SUPPORTING A CAMERA TO FACE A SUBJECT TO BE PHOTOGRAPHED AND FOR ILLUMINATING THE SUBJECT

CROSS-REFERENCE TO RELATED APPLICATION(S)

Reference is made to commonly assigned copending application Ser. No. 08/414,549 [our Docket No. 70937DAH], entitled IMAGE CAPTURE APPARATUS and filed Mar. 31, 1995 in the names of Dale F. McIntyre and Kenneth M. Haas.

The cross-referenced application is incorporated in this application.

FIELD OF THE INVENTION

The invention relates generally to the field of photography, and in particular to apparatus for supporting a camera to face a subject to be photographed and for illuminating the subject.

BACKGROUND OF THE INVENTION

It is generally known that a camera having an electronic flash unit, either built in or attached, can be used with an auxiliary lamp, for example in a photographic studio, for lighting the subject before taking a picture. The camera is often mounted on a tripod or other stable support, rather than being handheld. In some instances, such as disclosed in U.S. Pat. No. 3,804,356 and No. 4,963,903, the stable support includes a flexible extension for varying the position of the camera relative to the subject. Conversely, U.S. Pat. No. 2,682,816 suggests that a pair of incandescent lamps be mounted on the stable support separate from the camera. The incandescent lamps are attached to the stable support via respective flexible tubes which allow the positions of the incandescent lamps to be individually varied relative to the subject. A single actuating device is connected to the shutter of the camera and to the incandescent lamps to first turn on the lamps and then open the shutter.

When taking a picture using an electronic flash unit and a color print film, an undesirable phenomenon commonly known as "red-eye" may occur. Red-eye is typified by the pupils in the eyes of a person being photographed coming out red-tinted on a color print made from the exposed film. U.S. Pat. No. 4,285,588 teaches minimizing red-eye by having the electronic flash unit provide a brief subject-conditioning pre-flash light pulse prior to, and discrete from, the shutter opening and the flash exposure light pulse. The pre-flash light pulse causes the pupils in the eyes of the person being photographed to contract, and it precedes the shutter opening and the flash exposure light pulse by a period such as 0.35–0.60 seconds which is sufficient to ensure a substantial reduction in the size of the pupils. As a result, when the flash exposure light pulse is provided, less light is able to enter the eyes of the person being photographed and any red-eye is minimized.

In contrast to U.S. Pat. No. 4,285,588, U.S. Pat. No. 5,262,809 suggests that an auxiliary lamp be built into a camera in addition to a built-in flash unit. The built-in lamp is intended to provide the pre-flash light pulse for minimizing red-eye, and the built-in flash unit provides the flash exposure light pulse.

The Cross-Referenced Application

The cross-referenced application discloses a means for sensing the connection of a camera to a tripod.

2

SUMMARY OF THE INVENTION

A further feature of the invention, the camera has an electronic flash unit for providing a flash exposure light pulse, and selection means on the camera or an auxiliary lamp has a selection setting for allowing the auxiliary lamp to provide a subject-conditioning pre-flash light pulse before the electronic flash unit provides the flash exposure light and another setting for allowing the auxiliary lamp to be continuously on to illuminate the subject instead of providing the pre-flash light pulse.

DETAILED DESCRIPTION OF THE INVENTION

The invention is disclosed as being embodied preferably in a photographic assemblage including a flash camera. Because the features of a flash camera are generally known, the description which follows is directed in particular only to those elements forming part of or cooperating directly with the disclosed embodiment. It is to be understood, however, that other elements may take various forms known to a person of ordinary skill in the art.

PREFERRED EMBODIMENT

Figure 1:
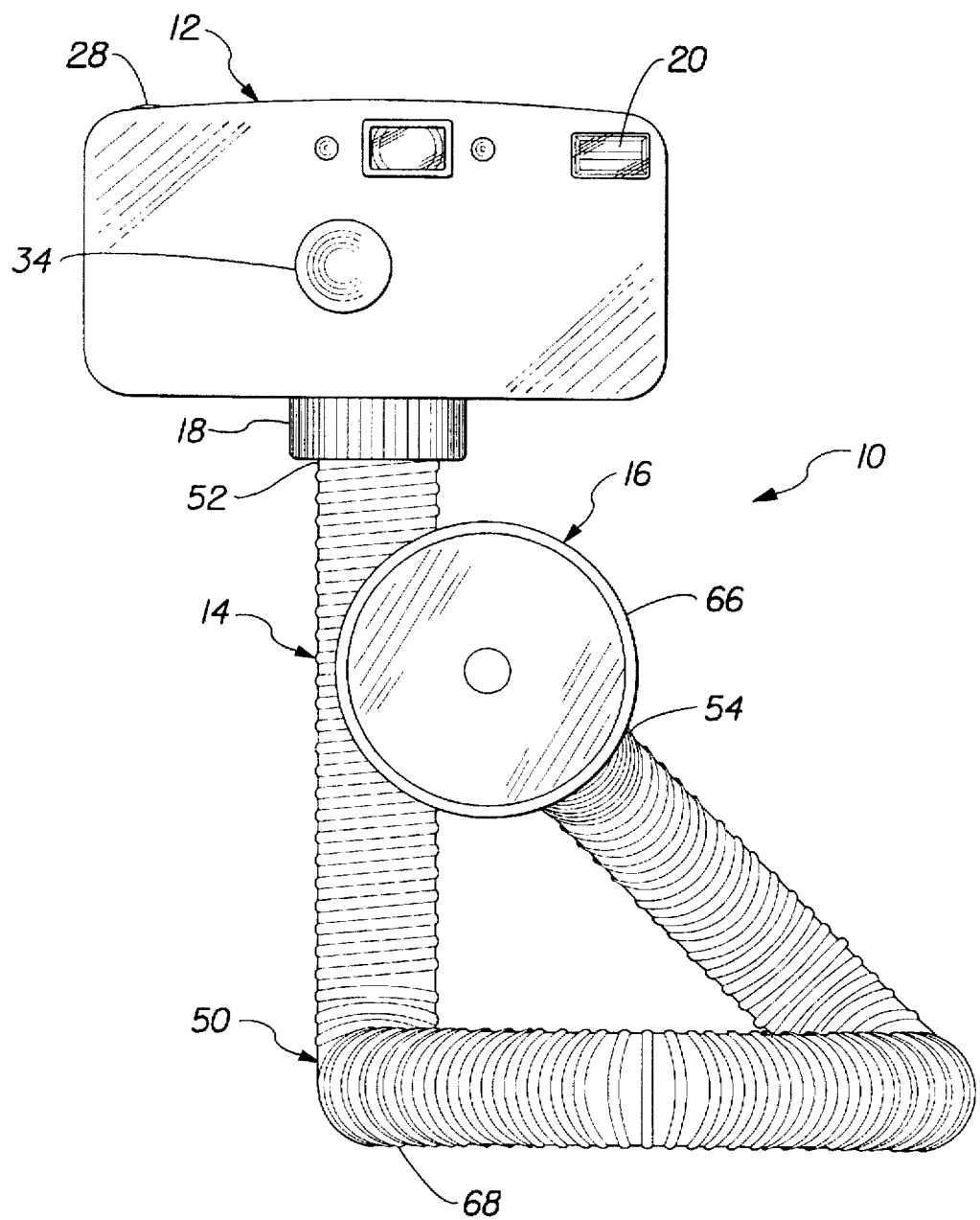
FIG. 1 is a front elevation view of a photographic assemblage comprising a camera, an auxiliary light, and a support for the camera and the auxiliary light, pursuant to a preferred embodiment of the invention.
Figure 2:
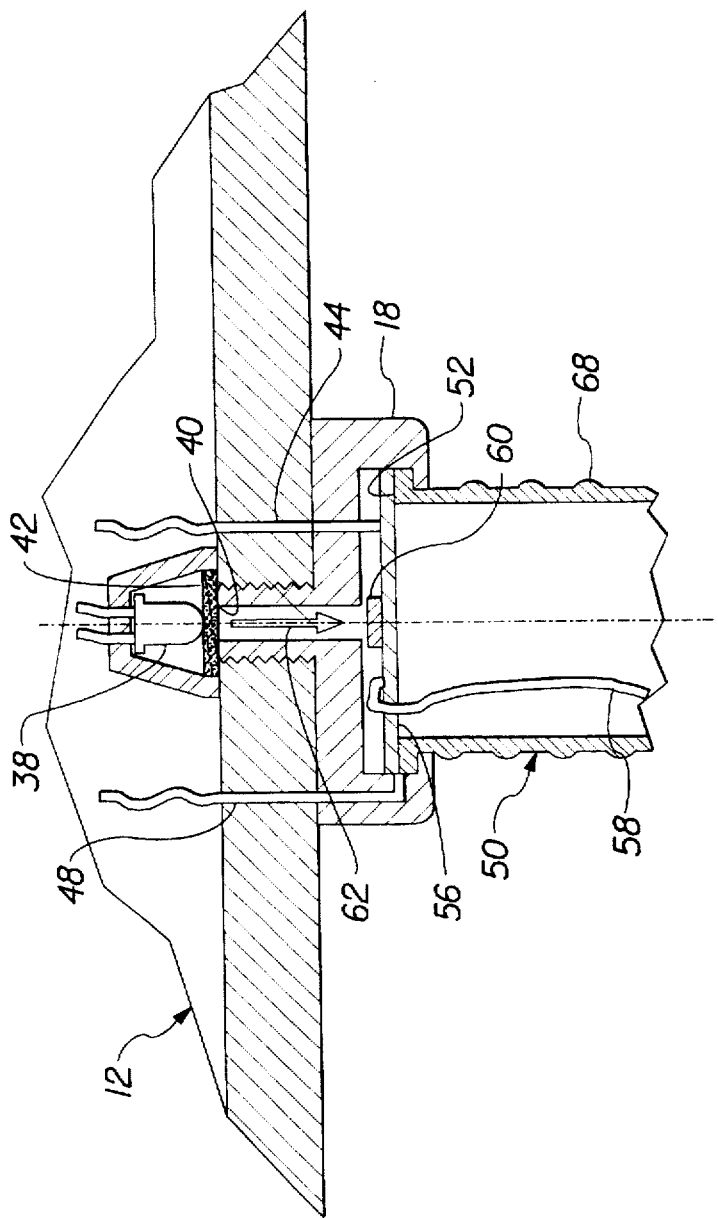
FIG. 2 is a section view of coupling device for connecting and disconnecting the camera and the auxiliary lamp.
Figure 3:
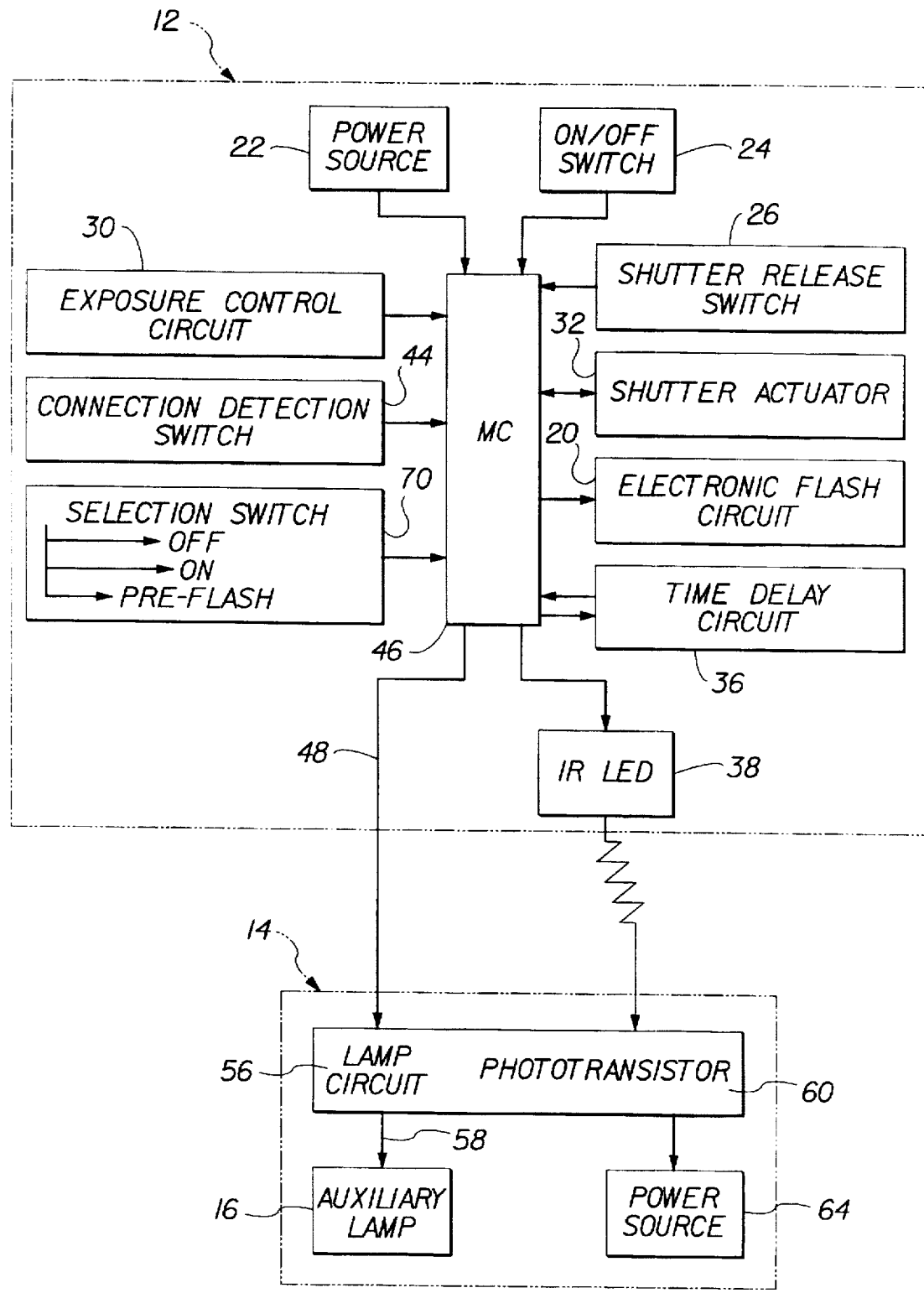
FIG. 3 is a schematic view of various components of the camera and the auxiliary lamp.

Referring now to the drawings, FIGS. 1–3 show a photographic assemblage 10 comprising a camera 12 and a support 14 for the camera including an auxiliary lamp 16 that is either an electronic strobe flash or an incandescent lamp. A coupling device 18 (shown in FIGS. 1 and 2) is provided for connecting the support 14 to the camera 12 and for disconnecting the support from the camera.

As shown in FIGS. 1–3, the camera 12 includes a known built-in electronic flash unit/circuit 20 (shown in FIGS. 1 and 3), a battery power source 22 (shown in FIG. 3) for powering the electronic flash unit (and other components of the camera), a manually movable ON/OFF switch 24 (shown in FIG. 3), a shutter release switch 26 (shown in FIG. 3) coupled to a manually depressible shutter release button 28 (shown in FIG. 1), a known exposure control circuit 30 (shown in FIG. 3) for sensing ambient light to determine whether the camera should be operated in a daylight exposure mode or a flash exposure mode, a known shutter actuator 32 (shown in FIG. 3) for effecting shutter opening and closing to momentarily uncover a taking lens 34 (shown in FIG. 1) to make a daylight or flash exposure, a known time delay circuit 36 (shown in FIG. 3), an IR LED (infrared light emitting diode) 38 (shown in FIGS. 2 and 3) for emitting infrared radiation from a radiation egress opening 40 (shown in FIG. 2) in the camera, a filter 42 (shown in FIG. 2) at the radiation egress opening for preventing ambient non-infrared radiation from entering the opening but allowing infrared radiation to be emitted from the opening, and a connection detection switch 44 (shown in FIGS. 2 and 3) or the equivalent such as disclosed in the cross-referenced application for determining whether or not the support 14 is connected to the camera via the coupling device 18. The electronic flash unit 20, the power source 22, the ON/OFF switch 24, the shutter release switch 26, the exposure control circuit 30, the shutter actuator 32, the time delay circuit 36, the IR LED 38, and the connection detection switch 44 of the camera 12 are individually coupled to a known controlling MC (microcomputer) 46. In addition, the support 14 can be removably coupled to the controlling MC 46 by a disconnectable lead 48 through the coupling device 18. See FIGS. 2 and 3.

As shown in FIGS. 1 and 2, the support 14 is a flexible tube 50 having one open end 52 connected to the auxiliary lamp 16 and an opposite open end 54 connected to the camera 12 via the coupling device 18. A known lamp circuit board 56 connected to the auxiliary lamp 16 by a wire lead 58 (shown in FIGS. 2 and 3) supports a phototransistor 60 at the open end 52 of the flexible tube 50 for receiving the infrared radiation from the IR LED (infrared light emitting diode) 38. A known optical fiber 62 (shown in FIG. 2) longitudinally extends between the IR LED 38 and the phototransistor 60 to transmit the infrared radiation from the IR LED to the phototransistor. A battery power source 64 is connected to the lamp circuit board 56 and is stored within a housing 66 of the auxiliary lamp 16 to power the auxiliary lamp. The flexible tube 50, like one in U.S. Pat. No. 4,963,903, is capable of being manually flexed along an intermediate portion 68 extending between the one open end 52 and the opposite open end 54 into various stable curves that hold their shape. Thus, the intermediate portion 68 can form corresponding supporting configurations for the auxiliary lamp 16 and the camera 12 to simultaneously support the camera and the auxiliary lamp facing a subject to be photographed and spaced from an object on which the intermediate portion is placed. See FIG. 1. The intermediate portion 68, when flexed into one of the stable curves, can rest on an object that is substantially level or it can be coiled securely around an object that is erect.

Operation

Figure 4:
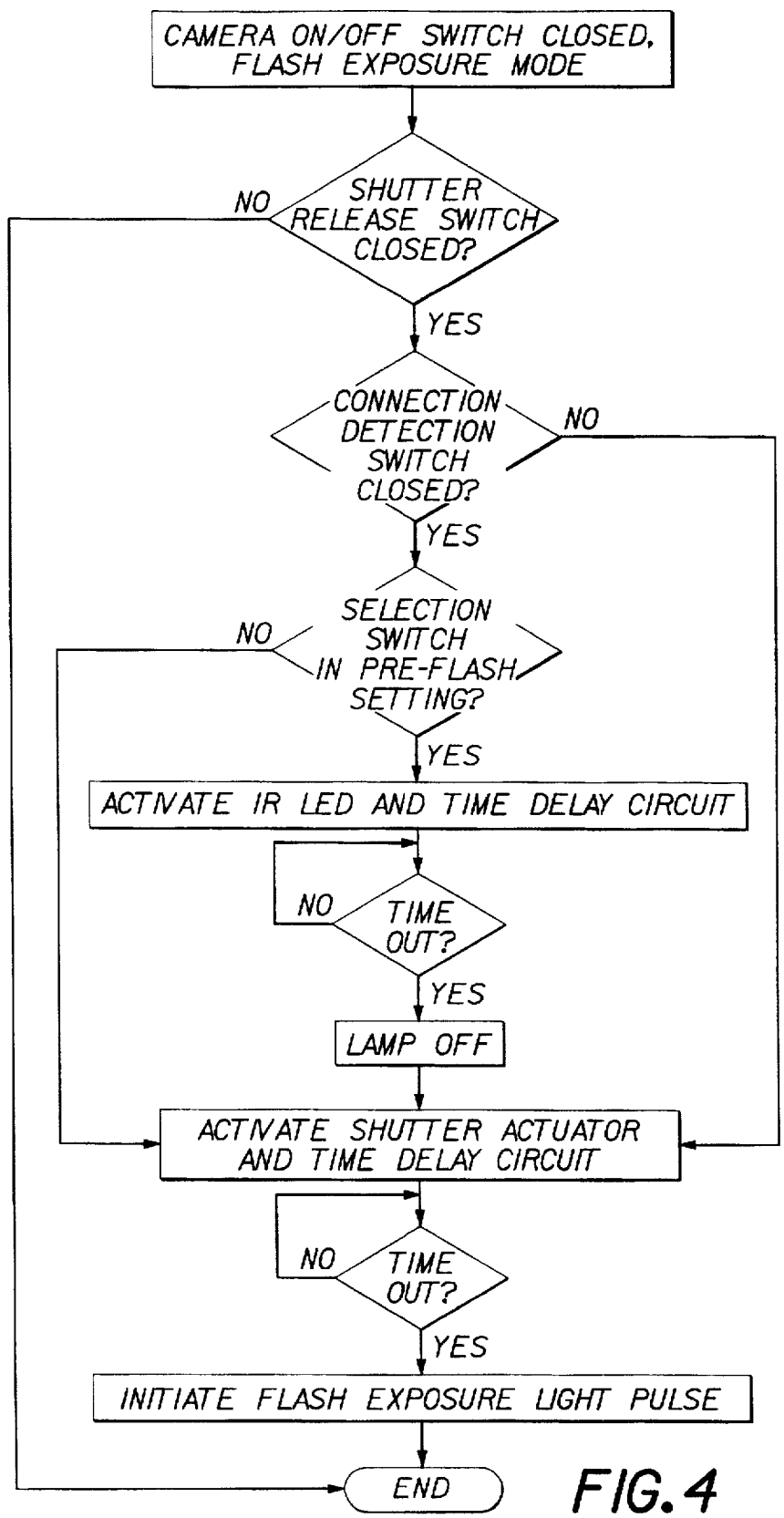
FIG. 4 is a flow chart depicting operation of the photographic assemblage.

FIG. 4 shows operation of the photographic assemblage 10 via the controlling MC 46 when the ON/OFF switch 24 is closed and the exposure control circuit 30 has determined that the camera 12 should be operated in a flash exposure mode. See FIG. 3.

When the shutter release switch 26 is closed by manual depression of the shutter release button 28, the connection detection switch 44 is closed because the support 14 is connected to the camera 12 via the coupling device 18, and a manual selection switch 70 on the camera or the support has been moved from an OFF setting to a PRE-FLASH setting, the IR LED 38 and the time delay circuit 36 are activated. Then, the phototransistor 60, responsive to receiving the infrared radiation from the IR LED 38, causes the auxiliary lamp 16 by way of the lamp circuit 56 and the power source 64 to emit a subject-conditioning pre-flash light pulse for minimizing any red-eye. The pre-flash light pulse is discontinued when the time delay circuit 36 times out after a fixed brief period. Then, the shutter actuator 32 is activated to begin shutter opening and the time delay circuit 36 is reactivated. When the time delay circuit 36 times out after a brief variable period the electronic flash unit 20, powered by the power source 22, provides a flash exposure light pulse. The time between the "Lamp OFF" step and the "Initiate Flash Exposure Light Pulse" step in FIG. 4 may be 0.30–0.65 seconds. This as disclosed in U.S. Pat. No. 4,285,588 is sufficient to minimize any red-eye.

If the manual selection switch 70 is moved from the OFF setting to an ON setting, rather than to the PRE-FLASH setting, the auxiliary lamp 16 is immediately turned on and remains on until the switch setting is changed. In this instance, the auxiliary lamp 16 does not provide a subject-conditioning pre-flash light pulse. See FIG. 4. Instead, the auxiliary lamp 16, powered by the power source 64, provides continuous light prior to and when the electronic flash unit 20, powered by the power source 22, provides the flash exposure light pulse.

If the connection detection switch 44 is open because the support 14 is not connected to the camera 12, then, when the shutter release switch 26 is closed by manual depression of the shutter release button 28, no pre-flash light pulse is provided to minimize any red-eye. See FIG. 4. In this instance, the electronic flash unit 20, powered by the power source 22, provides the flash exposure light pulse without any preceding light pulse or continuous light.

ALTERNATE EMBODIMENT

The alternate embodiment is identical to the preferred embodiment except that, when the connection detection switch 44 is open because the support 14 is not connected to the camera 12, the electronic flash unit 20 can provide a subject-conditioning pre-flash light pulse before it provides the flash exposure light pulse. See FIG. 5.

Operation

Figure 5:
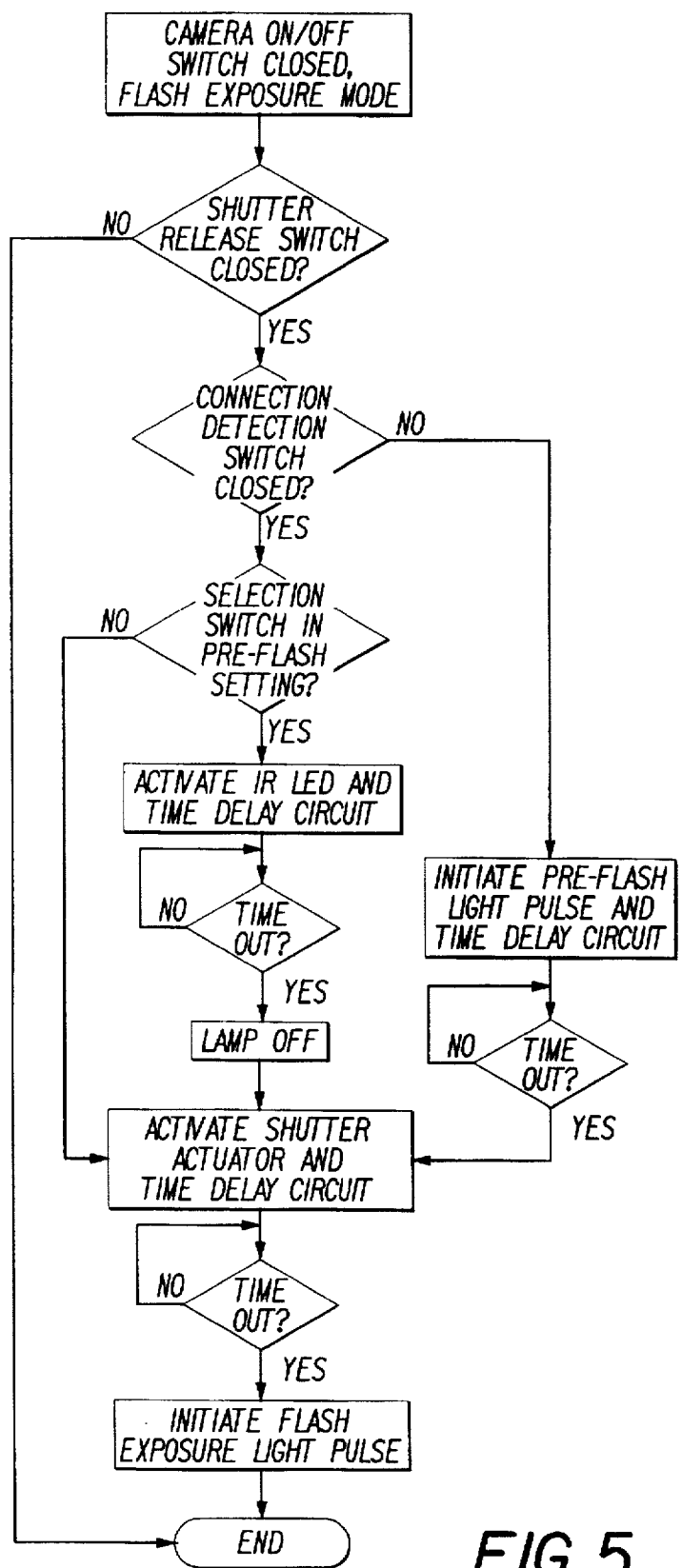
FIG. 5 is a flow chart depicting operation of the photographic assemblage, pursuant to an alternate embodiment of the invention.

FIG. 5 shows operation of the photographic assemblage 10 via the controlling MC 46 when the ON/OFF switch 24 is closed and the exposure control circuit 30 has determined that the camera 12 should be operated in a flash exposure mode.

When the shutter release switch 26 is closed by manual depression of the shutter release button 28, the connection detection switch 44 is closed because the support 14 is connected to the camera 12 via the coupling device 18, and the manual selection switch 70 has been moved from the OFF setting to the PRE-FLASH setting, the IR LED 38 and the time delay circuit 36 are activated. Then, the phototransistor 60, responsive to receiving the infrared radiation from the IR LED 38, causes the auxiliary lamp 16 by way of the lamp circuit 56 and the power source 64 to emit a subject-conditioning pre-flash light pulse for minimizing any red-eye. The pre-flash light pulse is discontinued when the time delay circuit 36 times out after a fixed brief period. Then, the shutter actuator 32 is activated to begin shutter opening and the time delay circuit 36 is reactivated. When the time delay circuit 36 times out after a brief variable period the electronic flash unit 20, powered by the power source 22, provides a flash exposure light pulse. The time between the "Lamp OFF" step and the "Initiate Flash Exposure Light Pulse" step in FIG. 5 may be 0.30–0.65 seconds. This as disclosed in U.S. Pat. No. 4,285,588 is sufficient to minimize any red-eye.

If the manual selection switch 70 is moved from the OFF setting to the ON setting, rather than to the PRE-FLASH setting, the auxiliary lamp 16 is immediately turned on and remains on until the switch setting is changed. In this instance, the auxiliary lamp 16 does not provide any subject-conditioning pre-flash light pulse. See FIG. 5. Instead, the auxiliary lamp 16, powered by the power source 64, provides continuous light prior to and when the electronic flash unit 20, powered by the power source 22, provides the flash exposure light pulse.

If the connection detection switch 44 is open because the support 14 is not connected to the camera 12, then, when the shutter release switch 26 is closed by manual depression of the shutter release button 28, the electronic flash unit 20, powered by the power source 22, emits a subject-conditioning pre-flash light pulse for minimizing any red-eye. The pre-flash light pulse is discontinued when the time delay circuit 36 times out after a fixed brief period. Then, the shutter actuator 32 is activated to begin shutter opening and the time delay circuit 36 is reactivated. When the time delay circuit 36 times out after a brief variable period the electronic flash unit 20, powered by the power source 22, provides a flash exposure light pulse.

The invention has been described with reference to a preferred embodiment. However, it will be appreciated that variations and modifications can be effected by a person of ordinary skill in the art without departing from the scope of the invention. For example, the time delay circuit 36 can be adjusted to cause the subject-conditioning light pulse to be used for blink avoidance as is known rather than for minimizing any red-eye.

Parts List 10. photographic assemblage
12. camera
14. support
16. auxiliary lamp
18. coupling device
20. electronic flash circuit
22. power source
24. ON/OFF switch
26. shutter release switch
28. shutter release button
30. exposure control circuit
32. shutter actuator
34. taking lens
36. time delay circuit
38. IR LED
40. radiation egress opening
42. filter
44. connection detection switch
46. MC
48. disconnectable lead
50. flexible tube
52. one tube end
54. opposite tube end
56. lamp circuit board
58. wire lead
60. phototransistor
62. optical fiber
64. power source
66. lamp housing
68. intermediate tube portion
70. selector switch

I claim:

1. A photographic assemblage comprising a camera with an electronic flash unit for providing a flash exposure light pulse, is characterized in that:

a single auxiliary lamp provides a subject-conditioning pre-flash light pulse before said electronic flash unit provides the flash exposure light pulse;

an infrared emitter in said camera emits infrared radiation from a radiation egress opening in the camera;

a phototransistor is capable of receiving the infrared radiation;

a lamp circuit connected to said phototransistor causes said auxiliary lamp to provide the pre-flash light pulse before said electronic flash unit provides the flash exposure light pulse, when said phototransistor receives the infrared radiation;

a filter at said radiation egress opening prevents ambient non-infrared radiation from entering the radiation egress opening but allows infrared radiation to be emitted from the radiation egress opening to said phototransistor; and a selector has a selection setting for causing said auxiliary lamp to be continuously on to provide continuous illumination, including when said electronic flash unit provides the flash exposure light pulse, instead of providing the pre-flash light pulse.

2. A camera comprising an electronic flash unit for providing a flash exposure light pulse, is characterized by:

control means for temporarily connecting said camera to a separate auxiliary lamp to allow the auxiliary lamp to provide a subject-conditioning pre-flash light pulse before said electronic flash unit provides the flash exposure light pulse and for disconnecting the auxiliary lamp from said camera to allow the electronic flash unit to provide the flash exposure light pulse without any preceding light pulse; and selector means connected to said control means and having a selection setting for causing the auxiliary lamp to be continuously on, including when said electronic flash unit provides the flash exposure light pulse, to provide continuous illumination rather than providing the pre-flash light pulse when the auxiliary lamp is connected to said camera.

3. An auxiliary lamp for illuminating a subject to be photographed, to be used with a camera having an electronic flash for providing a flash exposure light pulse, said auxiliary lamp comprising:

selection means having a selection setting for allowing said auxiliary lamp to provide a subject-conditioning pre-flash light pulse before the electronic flash unit provides the flash exposure light pulse and another setting for allowing the auxiliary lamp to be continuously on, including when the electronic flash unit provides the flash exposure light pulse, to continuously illuminate the subject instead Of providing the pre-flash light pulse; and a connector for connecting said auxiliary lamp to the camera.

* * * * *